(12) United States Patent
Matsuura

(10) Patent No.: US 10,359,057 B2
(45) Date of Patent: Jul. 23, 2019

(54) VALVE DEVICE AND FLUID PRESSURE CONTROL DEVICE

(71) Applicant: KYB Corporation, Tokyo (JP)

(72) Inventor: Akio Matsuura, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/566,259

(22) PCT Filed: Mar. 14, 2016

(86) PCT No.: PCT/JP2016/057998
§ 371 (c)(1),
(2) Date: Oct. 13, 2017

(87) PCT Pub. No.: WO2016/167065
PCT Pub. Date: Oct. 20, 2016

(65) Prior Publication Data
US 2018/0106277 A1    Apr. 19, 2018

(30) Foreign Application Priority Data

Apr. 15, 2015   (JP) ................. 2015-083463

(51) Int. Cl.
*E02F 9/22*      (2006.01)
*F15B 11/02*    (2006.01)
(Continued)

(52) U.S. Cl.
CPC .......... *F15B 11/028* (2013.01); *E02F 9/2225* (2013.01); *E02F 9/2267* (2013.01);
(Continued)

(58) Field of Classification Search
CPC ..... E02F 9/2203; E02F 9/2225; E02F 9/2267; E02F 9/2285; F15B 11/02; F15B 11/028; F15B 11/0402; F15B 11/0422; F16K 11/07; F16K 31/363; Y10T 137/7847; Y10T 137/7848; Y10T 137/7793–7831; Y10T 137/87338
(Continued)

(56) References Cited

U.S. PATENT DOCUMENTS 1,156,011 A * 10/1915 Kenney ................. G05D 16/10
                                              137/505.13
2,410,422 A * 11/1946 Breene ................. C03B 40/027
                                              118/251
(Continued)

FOREIGN PATENT DOCUMENTS

| JP | S61-24886 A | 2/1986 |
| JP | 2005-140248 A | 6/2005 |
| JP | 2008-202724 A | 9/2008 |

*Primary Examiner* — William M McCalister
(74) *Attorney, Agent, or Firm* — Rabin & Berdo, P.C.

(57) ABSTRACT

A valve device includes a valve body, a drain chamber wall configured to define a drain chamber, a drain port formed in the drain chamber wall facing the valving element, and a drain passage configured to guide drain fluid from another valve device to the drain chamber, wherein at least one of the drain chamber wall and the valving element includes a communicating passage configured to allow the drain port to communicate with the drain chamber when the movement of the valving element is restricted by the drain chamber wall.

6 Claims, 7 Drawing Sheets

(51) Int. Cl.
*F15B 13/04* (2006.01)
*F16K 11/07* (2006.01)
*F15B 11/028* (2006.01)
*F15B 13/042* (2006.01)
*F16K 31/363* (2006.01)

(52) U.S. Cl.
CPC .............. *F15B 11/02* (2013.01); *F16K 11/07* (2013.01); *F16K 31/363* (2013.01); *E02F 9/2203* (2013.01); *E02F 9/2282* (2013.01); *E02F 9/2285* (2013.01); *F15B 13/0402* (2013.01); *F15B 13/0422* (2013.01)

(58) Field of Classification Search
USPC ............ 251/63.5, 63.6, 318–334; 137/513.3, 137/513.5, 505–505.47, 599.11
See application file for complete search history.

(56) References Cited

U.S. PATENT DOCUMENTS

| | | | | |
|---|---|---|---|---|
| 2,979,080 A | * | 4/1961 | Hewitt | F16K 11/0716 137/625.68 |
| 3,112,763 A | * | 12/1963 | Tennis | F16K 17/18 137/493.5 |
| 3,117,591 A | * | 1/1964 | Schutmaat | G05D 16/0658 137/505.41 |
| 3,563,273 A | * | 2/1971 | Mills | F15B 13/04 137/625.69 |
| 3,856,041 A | * | 12/1974 | Cryder | F16K 17/26 137/115.16 |
| 4,191,210 A | * | 3/1980 | Belart | B60T 8/5025 137/505.13 |
| 4,217,927 A | * | 8/1980 | Morita | F16K 17/196 137/454.5 |
| 4,270,567 A | * | 6/1981 | Tsukimoto | F16K 17/048 137/493.3 |
| 4,381,099 A | * | 4/1983 | Knedlik | B67D 1/1438 222/504 |
| 4,844,119 A | * | 7/1989 | Martinic | B60T 8/3615 137/596.17 |
| 5,213,132 A | * | 5/1993 | Comment | G05D 7/0126 137/505.25 |
| 5,261,447 A | * | 11/1993 | Boticki | G05D 16/163 137/493.2 |
| 5,323,809 A | * | 6/1994 | Tischer | F16K 31/0613 137/513.5 |
| 5,722,454 A | * | 3/1998 | Smith | F16K 17/34 137/244 |
| 6,257,268 B1 | * | 7/2001 | Hope | G05D 16/103 137/111 |
| 7,140,385 B2 | * | 11/2006 | Thorns | F16K 17/105 137/493.6 |
| 7,240,604 B2 | * | 7/2007 | Smith | F15B 11/006 251/30.01 |
| 7,357,153 B2 | * | 4/2008 | Kawamura | G05D 16/103 137/505.25 |
| 7,581,560 B2 | * | 9/2009 | Koch | F16K 15/026 137/543.19 |
| 7,658,405 B2 | * | 2/2010 | Gibbons | B60R 21/268 137/513.3 |
| 8,622,080 B2 | * | 1/2014 | Pucher | F16K 31/0658 137/495 |
| 2003/0200747 A1 | * | 10/2003 | Matsumoto | E02F 9/2235 60/452 |
| 2006/0142107 A1 | * | 6/2006 | Kobayashi | F15B 11/055 475/116 |
| 2010/0059130 A1 | * | 3/2010 | Tougasaki | F15B 13/0417 137/613 |
| 2010/0181519 A1 | * | 7/2010 | Li | F16K 11/0445 251/325 |
| 2010/0286605 A1 | * | 11/2010 | Klug | A61M 5/31596 604/89 |
| 2011/0048423 A1 | * | 3/2011 | Leffel | A61M 16/20 128/205.24 |
| 2015/0260139 A1 | * | 9/2015 | Rouillon | F02M 63/005 137/513.5 |
| 2018/0106277 A1 | * | 4/2018 | Matsuura | F16K 31/363 |

* cited by examiner

VALVE DEVICE AND FLUID PRESSURE CONTROL DEVICE

TECHNICAL FIELD

The present invention relates to a valve device including a drain port, and a fluid pressure control device including this valve device.

BACKGROUND ART

JP2008-202724A discloses a spring return type control valve as one example of a valve device. This control valve includes a valving element (spool) housed in a sliding hole of a valve body, a pilot chamber formed on one end of the sliding hole, a drain chamber formed on the other end of the sliding hole, and a return spring housed in the pilot chamber.

When pilot pressure is supplied to the pilot chamber, the spool moves toward the drain chamber due to the pilot pressure. When the supply of the pilot pressure to the pilot chamber is blocked, the spool moves toward the pilot chamber due to a restoring force of the return spring.

A drain port is formed in a drain chamber wall that defines the drain chamber. Working oil in the drain chamber is discharged to a tank via the drain port as drain fluid.

SUMMARY OF INVENTION

In recent years, there has been a demand for providing a plurality of valve devices in a fluid pressure control device for controlling the work of a fluid pressure actuator. If the fluid pressure control device provides a plurality of valve devices, each of which having a drain port, the same number of drain ports as the number of the valve devices will be formed in the fluid pressure control device. Therefore, conduits to guide the drain fluid of each valve device to the tank need to be connected to each of the drain ports of the valve devices, thus making the piping work complex.

In order to facilitate the piping work, it may be considered to employ a control valve disclosed in JP2008-202724A for one of the plurality of valve devices, and form a passage that guides the drain fluid of the other valve devices to that one valve device, in the valve body.

However, in the control valve disclosed in JP2008-202724A, the drain chamber wall functions as a movement restricting portion that restricts the movement of the spool by contacting the spool. In a case in which the drain port is formed in the drain chamber wall facing the spool, the drain port will be closed by the spool that contacts the drain chamber wall. That is to say, depending on the spool position, the drain fluid of the other valve devices cannot be discharged from the drain port.

An object of the present invention is to provide a valve device and a fluid pressure control device that allows for discharging drain fluid of other valve devices from a drain port, regardless of the position of a valving element.

According to one aspect of the present invention, a valve device includes a valving element housed movably inside a valve body, a drain chamber wall configured to define a drain chamber where the valving element enters and exits together with a movement of the valving element, a drain port formed in the drain chamber wall facing the valving element, the drain port being configured to allow the drain chamber to communicate with a fluid storage portion, and a drain passage configured to guide drain fluid from another valve device to the drain chamber, wherein at least one of the drain chamber wall and the valving element has a communicating passage configured to allow the drain port to communicate with the drain chamber when the movement of the valving element is restricted by the drain chamber wall.

DESCRIPTION OF EMBODIMENTS

Described below with reference to the drawings is an embodiment of the present invention. Although a valve device and a fluid pressure control device installed in a hydraulic shovel are described in the present embodiment, the present invention is also applicable to devices other than the hydraulic shovel. Moreover, in the present embodiment, although working oil is used as the working fluid, other fluids such as working water may be used as the working fluid.

Figure 1:
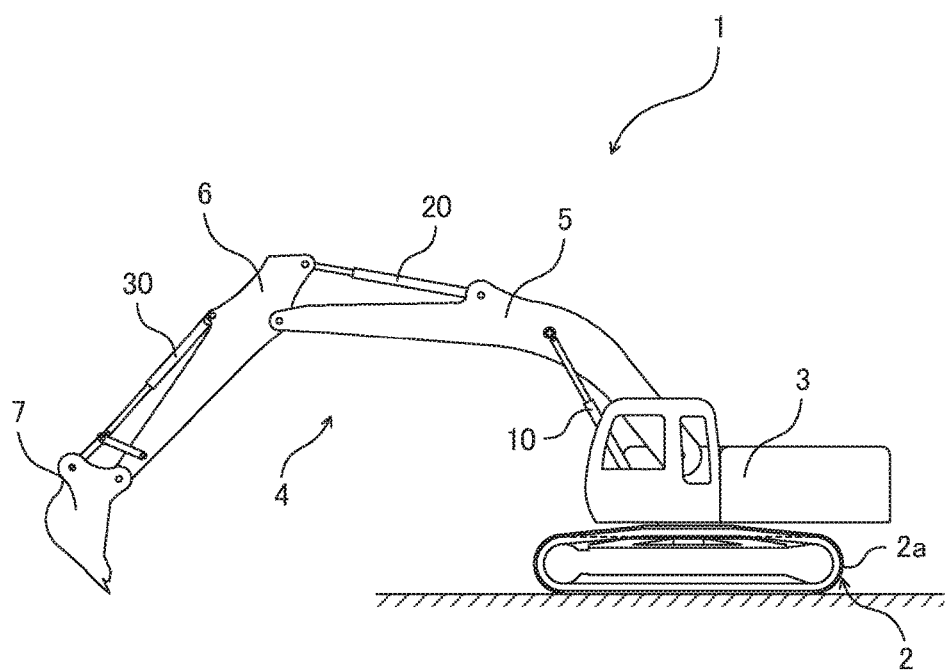
FIG. 1 is a schematic view of a hydraulic shovel to which a valve device and a fluid pressure control device according to an embodiment of the present invention is applied.

As shown in FIG. 1, a hydraulic shovel 1 includes a crawler type traveling portion 2, a revolving portion 3 provided above the traveling portion 2 in a revolvable manner, and a digging portion 4 provided at a front center portion of the revolving portion 3.

The traveling portion 2 has a pair of left and right crawlers 2a. The hydraulic shovel 1 travels by a traveling motor (illustration omitted) driving the pair of left and right crawlers 2a. The revolving portion 3 revolves about a vertical axis by a revolving motor (illustration omitted).

The digging portion 4 has a boom 5, an arm 6, and a bucket 7. The boom 5 is supported by the revolving portion 3 rotationally movable about a horizontal axis. The arm 6 is supported rotationally movable at the tip of the boom 5. The bucket 7 is supported rotationally movable at the tip of the arm 6 to dig dirt and sand.

Moreover, the digging portion 4 includes a boom cylinder 10 that rotationally moves the boom 5, an arm cylinder 20 that rotationally moves the arm 6, and a bucket cylinder that rotationally moves the bucket 7. Extending and contracting of the boom cylinder 10, the arm cylinder 20, and the bucket cylinder 30 are controlled by using a fluid pressure control device 100 (see FIG. 2).

In the description of the present specification, the boom cylinder 10, the arm cylinder 20, and the bucket cylinder 30 may also be simply called "cylinder", and the boom 5, the arm 6, and the bucket 7 may be called "load".

Figure 2:
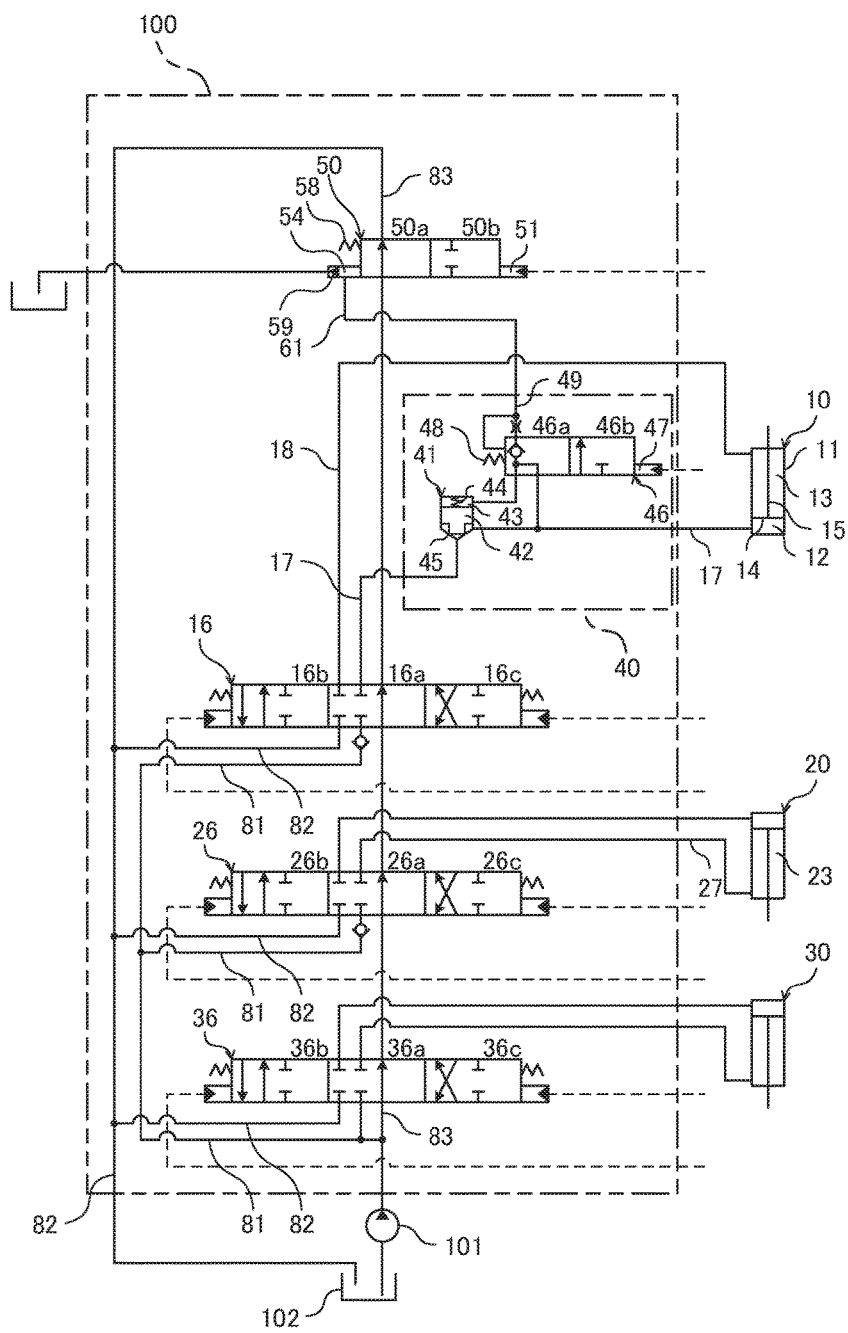
FIG. 2 is a hydraulic circuit diagram of a fluid pressure control device according to an embodiment of the present invention.

As shown in FIG. 2, the fluid pressure control device 100 includes a supplying passage 81, a discharging passage 82, and control valves 16, 26, and 36 provided in the supplying passage 81. The supplying passage 81 guides working oil discharged from a pump 101 serving as a fluid pressure supplying portion, to the cylinders 10, 20, and 30. The discharging passage 82 guides the working oil discharged from the cylinders 10, 20, and 30 to a tank 102 serving as a fluid storage section. The control valves 16, 26, and 36 control supplying of the working oil from the pump 101 to the cylinders 10, 20, and 30, respectively, and also controls discharging of the working oil from the corresponding cylinders 10, 20, and 30 to the tank 102.

The boom cylinder 10 is a double-acting cylinder having a piston 14 that partitions an inside of a cylinder tube 11 into a counter rod side chamber 12 and a rod side chamber 13. The piston 14 is attached with a rod 15. A first main passage 17 connects the counter rod side chamber 12 with the control valve 16, and a second main passage 18 connects the rod side chamber 13 with the control valve 16. In the description in the present specification, the first main passage 17 may simply be called "main passage".

The control valve 16 is a 6-port 3-position switching valve having a neutral position 16a to stop a work of the boom cylinder 10, an extending position 16b to extend the boom cylinder 10, and a contracting position 16c to contract the boom cylinder 10. In the following description, the extending position 16b and the contracting position 16c may also be called a "working position".

The arm cylinder 20 and the bucket cylinder 30 are double-acting cylinders, and the control valves 26 and 36 are 6-port 3-position switching valves. The structures of the cylinders 20 and 30 and those of the control valves 26 and 36 are the same as the structure of the boom cylinder 10 and that of the control valve 16, respectively; hence, their explanations are omitted here.

Moreover, the fluid pressure control device 100 includes a neutral passage 83 that communicates with the supplying passage 81 on a side upstream of the control valves 16, 26, and 36, and a neutral cut valve 50 serving as a valve device provided in the neutral passage 83. The neutral cut valve 50 is a 2-port 2-position switching valve having a communicating position 50a to enable the flow of the working oil in the neutral passage 83, and a disconnecting position 50b to block the flow of the working oil in the neutral passage 83.

The neutral passage 83 allows the supplying passage 81 to communicate with the discharging passage 82 via the control valves 16, 26, and 36. The neutral cut valve 50 is provided in the neutral passage 83 on a downstream side of the control valves 16, 26, and 36.

The neutral cut valve 50 has a pilot chamber 51, and in accordance with the supply of pilot pressure to the pilot chamber 51, the valve switches between the communicating position 50a and the disconnecting position 50b. When no pilot pressure is supplied to the pilot chamber 51, the neutral cut valve 50 maintains the communicating position 50a due to an biasing force of a spring 58 of the neutral cut valve 50. When pilot pressure is supplied to the pilot chamber 51, the neutral cut valve 50 switches from the communicating position 50a to the disconnecting position 50b. When the supply of pilot pressure to the pilot chamber 51 is blocked, the neutral cut valve 50 returns to the communicating position 50a due to the biasing force of the spring 58.

When at least one of the control valves 16, 26, and 36 switches from the neutral positions 16a, 26a, and 36a to the working positions 16b, 16c, 26b, 26c, 36b, or 36c, pilot pressure is supplied to the pilot chamber 51. At this time, the neutral cut valve 50 switches from the communicating position 50a to the disconnecting position 50b.

When all of the control valves 16, 26, and 36 switches from the working positions 16b, 16c, 26b, 26c, 36b, and 36c to the neutral positions 16a, 26a, and 36a, the supply of the pilot pressure to the pilot chamber 51 is blocked. At this time, the neutral cut valve 50 switches from the disconnecting position 50b to the communicating position 50a. The working oil discharged from the pump 101 is guided through the neutral passage 83 and the discharging passage 82 to the tank 102.

When the control valve 16 is in the extending position 16b, the flow of working oil in the supplying passage 81 and the discharging passage 82 are enabled, and the flow of working oil in the neutral passage 83 is blocked. In this case, the counter rod side chamber 12 communicates with the supplying passage 81, and the rod side chamber 13 communicates with the discharging passage 82. The working oil discharged from the pump 101 is supplied to the counter rod side chamber 12, and the working oil inside the rod side chamber 13 is discharged to the tank 102. As a result, the boom cylinder 10 extends, and the boom 5 (see FIG. 1) lifts up.

When the control valve 16 is in the contracting position 16c, the flow of working oil in the supplying passage 81 and the discharging passage 82 are enabled, and the flow of working oil in the neutral passage 83 is blocked. In this case, the counter rod side chamber 12 communicates with the discharging passage 82, and the rod side chamber 13 communicates with the supplying passage 81. The working oil discharged from the pump 101 is supplied to the rod side chamber 13, and the working oil inside the counter rod side chamber 12 is discharged to the tank 102. As a result, the boom cylinder 10 contracts, and the boom 5 (see FIG. 1) lowers down.

The neutral cut valve 50 is suitable in cases in which the flow of working oil in the neutral passage 83 is not sufficiently blocked by the control valve 16 even if the control valve 16 is in the working position 16b or 16c. By blocking the flow of working oil in the neutral passage 83 with the neutral cut valve 50, a larger pressure can be acted on the boom cylinder 10 when extending or contracting the boom cylinder 10 upon switching the control valve 16 to the working position 16b or 16c.

When the control valve 16 is in the neutral position 16a, the flow of working oil in the supplying passage 81 and the discharging passage 82 are blocked. Therefore, the working oil discharged from the pump 101 is not supplied to the boom cylinder 10. That is to say, the boom cylinder 10 does not work.

When all of the control valves 16, 26, and 36 are in their neutral positions 16a, 26a, and 36a and none of the cylinders 10, 20, or 30 are working, and the neutral cut valve 50 is in the communicating position 50a, the flow of working oil in the neutral passage 83 is enabled. Therefore, the working oil discharged from the pump 101 returns to the tank 102 without being supplied to the cylinders 10, 20, and 30.

Here describes a load acting on the boom cylinder 10. When the control valve 16 is switched to the neutral position 16a in a state in which the boom 5 shown in FIG. 1 is lifted, a force in a direction of contracting acts on the boom cylinder 10 due to dead load of the digging portion 4. That is to say, a load pressure acts on the counter rod side chamber 12. In the following description, the counter rod side chamber 12 may also be called "load side pressure chamber".

The fluid pressure control device 100 further includes a load retaining portion 40 provided in the first main passage 17, which retains a load pressure that acts on the counter rod side chamber 12. By the load retaining portion 40 retaining the load pressure, it is possible to prevent the boom 5 (see FIG. 1) from lowering down.

The load retaining portion 40 may be provided in the main passage 27 that connects the rod side chamber 23 corresponding to a load side pressure chamber of the arm cylinder 20, to the control valve 26. In this case, the load retaining portion 40 can prevent the arm 6 (see FIG. 1) from lowering down.

The structure of the load retaining portion 40 will be described in details.

The load retaining portion 40 has an operated check valve 41 provided in the first main passage 17, a switching valve 46 that switches the work of the operated check valve 41, and a check valve passage 49 connected to the operated check valve 41 via the switching valve 46.

The operated check valve 41 has a valving element 42 that opens and closes the first main passage 17, a rear pressure chamber 43 provided facing a rear plane of the valving element 42, and a spring 44 housed in the rear pressure chamber 43. Pressure of the rear pressure chamber 43 and an biasing force of the spring 44 act on the valving element 42 in a direction that the valving element 42 is seated onto the seat portion 45 (valve-closing direction). The pressure within the first main passage 17 acts on the valving element 42 in a direction separating the valving element 42 away from the seat portion 45 (valve-opening direction). That is to say, the valving element 42 receives load due to the pressure inside the rear pressure chamber 43 and the biasing force of the spring 44 in the valve-closing direction, and receives load due to the pressure inside the first main passage 17 in the valve-opening direction.

When the load acting on the valving element 42 due to the pressure inside the first main passage 17 is smaller than the load acting on the valving element 42 due to the pressure inside the rear pressure chamber 43 and the biasing force of the spring 44, the valving element 42 sits on the seat portion 45 and blocks the flow of working oil in the first main passage 17. When the load acting on the valving element 42 due to the pressure inside the first main passage 17 is larger than the load acting on the valving element 42 due to the pressure inside the rear pressure chamber 43 and the biasing force of the spring 44, the valving element 42 separates away from the seat portion 45 and enables the flow of the working oil in the first main passage 17. As such, the valving element 42 opens and closes in accordance with the pressure inside the rear pressure chamber 43.

The rear pressure chamber 43 is connected to the counter rod side chamber 12 via the switching valve 46, and is connected to the check valve passage 49 via the switching valve 46. The check valve passage 49 guides the working oil inside the rear pressure chamber 43 to outside the load retaining portion 40.

The switching valve 46 has a first position 46a and a second position 46b. The first position 46a and the second position 46b are switched in accordance with the supply of pilot pressure to the pilot chamber 47 of the switching valve 46.

When no pilot pressure is supplied to the pilot chamber 47, the switching valve 46 maintains the first position 46a due to the biasing force of the spring 48 of the switching valve 46. When pilot pressure is supplied to the pilot valve 47, the switching valve 46 switches from the first position 46a to the second position 46b. When the supply of the pilot pressure to the pilot chamber 47 is blocked, the switching valve 46 returns to the first position 46a due to the biasing force of the spring 48.

When the control valve 46 is in the neutral position 16a or the extending position 16b, no pilot pressure is supplied to the pilot chamber 47. Therefore, the switching valve 46 maintains the first position 46a.

When the control valve 16 switches to the contracting position 16c, pilot pressure is supplied to the pilot chamber 47. Therefore, the switching valve 46 switches from the first position 46a to the second position 46b.

Here describes a relationship between the position of the control valve 16 and the opened and close states of the operated check valve 41.

First described is a case in which the control valve 16 is in the neutral position 16a.

When the control valve 16 is in the neutral position 16a, no pilot pressure is supplied to the pilot chamber 47. Therefore, the switching valve 46 is in the first position 46a.

When the switching valve 46 is in the first position 46a, the supply of working oil from the counter rod side chamber 12 to the rear pressure chamber 43 are enabled and the discharging of working oil from the rear pressure chamber 43 to the check valve passage 49 is blocked. Since the working oil inside the rear pressure chamber 43 is not discharged, the working oil supplied from the counter rod side chamber 12 to the rear pressure chamber 43 accumulates in the rear pressure chamber 43, and the pressure of the counter rod side chamber 12 acts on the rear pressure chamber 43 via the first main passage 17. Therefore, the valving element 42 receives a load due to the biasing force of the spring 44 and the pressure of the counter rod side chamber 12 in the valve-closing direction.

When the control valve 16 is in the neutral position 16a, the pressure of the working oil discharged from the pump 101 does not act on the first main passage 17. Therefore, the valving element 42 receives a load due to the pressure of the counter rod side chamber 12 in the valve-opening direction. On the valving element 42, a load due to the biasing force of the spring 44 and the pressure of the counter rod side chamber 12 acts in the valve-closing direction, while a load just due to the pressure of the counter rod side chamber 12 acts in the valve-opening direction. Hence, the load that acts on the valving element 42 in the valve-opening direction is smaller than the load acting on the valving element 42 in the valve-closing direction.

Since the load in the valve-opening direction is smaller than the load in the valve-closing direction, the valving element 42 sits on the seat portion 45. That is to say, the operated check valve 41 closes, and blocks the flow of the working oil in the first main passage 17. Therefore, the load pressure acting on the counter rod side chamber 12 is retained, and allows for preventing the digging portion 4 (see FIG. 1) from lowering down.

Next describes a case in which the control valve 16 is in the extending position 16b.

When the control valve 16 is in the extending position 16b, no pilot pressure is supplied to the pilot chamber 47.

Therefore, the switching valve 46 is maintained in the first position 46a. As with the case in which the control valve 16 is in the neutral position 16a, the valving element 42 receives a load due to the biasing force of the spring 44 and the pressure of the counter rod side chamber 12, in the valve-closing direction.

When the control valve 16 is in the extending position 16b, the pressure of the working oil discharged from the pump 101 acts on the first main passage 17. Accordingly, a load due to the pressure of the working oil discharged from the pump 101 acts on the valving element 42 in addition to the load due to the pressure of the counter rod side chamber 12. Therefore, the load in the valve-opening direction acting on the valving element 42 is greater than the load in the valve-closing direction acting on the valving element 42.

Since the load in the valve-opening direction is greater than the load in the valve-closing direction, the valving element 42 separates from the seat portion 45. That is to say, the operated check valve 41 opens, and enables the working oil to flow in the first main passage 17. Therefore, the working oil discharged from the pump 101 is supplied to the counter rod side chamber 12, thus allowing for lifting the digging portion 4 (see FIG. 1).

Next described is a case in which the control valve 16 is in the contracting position 16c.

When the control valve 16 is in the contracting position 16c, pilot pressure is supplied to the pilot chamber 47. Therefore, the switching valve 46 switches from the first position 46a to the second position 46b.

When the switching valve 46 is in the second position 46b, the supply of the working oil from the counter rod side chamber 12 to the rear pressure chamber 43 is blocked, and the discharging of the working oil from the rear pressure chamber 43 to the check valve passage 49 is enabled. Since the working oil inside the rear pressure chamber 43 is discharged from the load retaining portion 40 without the working oil being supplied to the rear pressure chamber 43, hardly any pressure of the working oil acts on the rear pressure chamber 43. Therefore, the valving element 42 receives a load just due to the biasing force of the spring 44, in the valve-closing direction.

When the control valve 16 is in the contracting position 16c, the pressure of the working oil discharged from the pump 101 acts on the rod side chamber 13 via the second main passage 18. The pressure inside the rod side chamber 13 acts on the valving element 42 in the valve-opening direction via the counter rod side chamber 12 and the first main passage 17. Therefore, the load in the valve-opening direction acting on the valving element 42 is greater than the load in the valve-closing direction acting on the valving element 42.

Since the load in the valve-opening direction is greater than the load in the valve-closing direction, the valving element 42 separates from the seat portion 45. That is to say, the operated check valve 41 opens, and enables the working oil to flow in the first main passage 17. Therefore, the load pressure acting on the counter rod side chamber 12 is no longer retained, and the digging portion 4 (see FIG. 1) can be lowered.

As such, the operated check valve 41 closes when the control valve 16 is in the neutral position 16a, and opens when the control valve 16 is in the working positions 16b and 16c.

Figure 3:
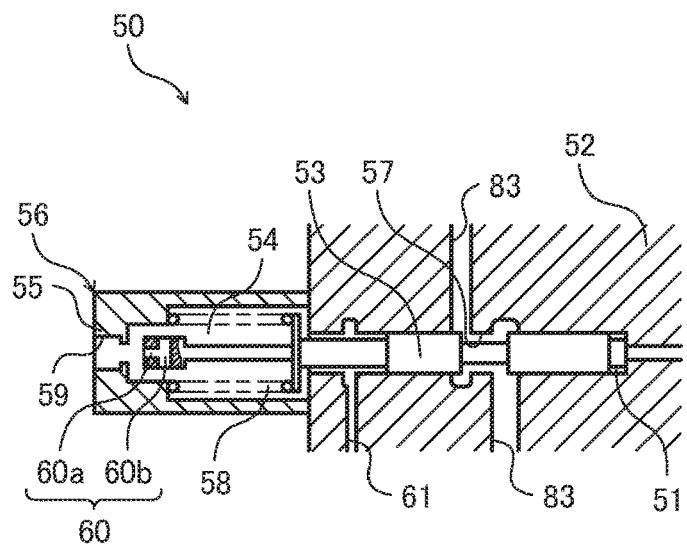
FIG. 3 is a sectional view of a neutral cut valve according to an embodiment of the present invention, and shows a state in which the neutral cut valve is in a communicating position.
Figure 4:
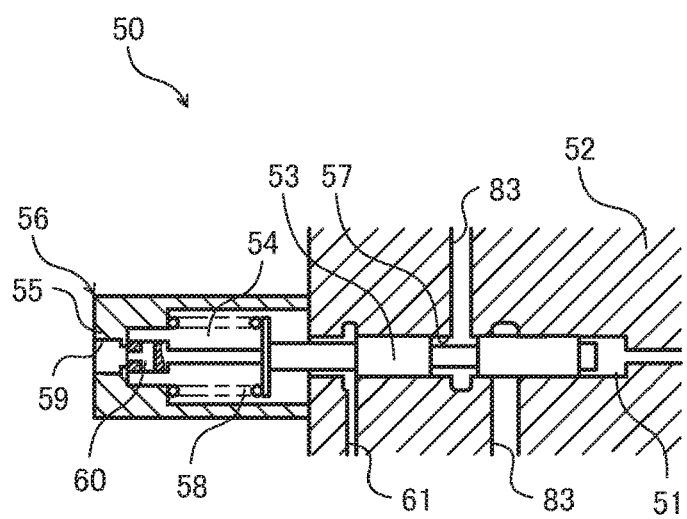
FIG. 4 is a sectional view of the neutral cut valve according to an embodiment of the present invention, and shows a state in which the neutral cut valve is in a disconnecting position.

With reference to FIG. 2 to FIG. 4, the structure of the neutral cut valve 50 will be described in details. FIG. 3 is a sectional view of the neutral cut valve 50 in the communicating position 50a, and FIG. 4 is a sectional view of the neutral cut valve 50 in the disconnecting position 50b.

The neutral cut valve 50 includes a valve body 52, a spool 53 serving as a valving element housed movably inside the valve body 52, and a drain chamber wall 55 that defines a drain chamber 54. The drain chamber wall 55 is provided in a cap 56 formed as a separate body to the valve body 52.

The valve body 52 has a sliding hole 57 formed therein, and the neutral passage 83 communicates with the sliding hole 57. The spool 53 is housed inside the sliding hole 57, and the flow of working oil in the neutral passage 83 is enabled and blocked by movement of the spool 53.

The drain chamber 54 is formed on one end of the sliding hole 57; accompanying the movement of the spool 53, the spool 53 enters and exits the drain chamber 54. A spring 58 is housed in the drain chamber 54, and the spring 58 extends and contracts accompanying the movement of the spool 53.

The pilot chamber 51 is formed on the other end of the sliding hole 57. When pilot pressure is supplied to the pilot chamber 51, the spool 53 moves in a direction entering into the drain chamber 54 against the biasing force of the spring 58 due to the pilot pressure, and blocks the flow of working oil in the neutral passage 83. When the supply of the pilot pressure to the pilot chamber 51 is blocked, the spool 53 moves in a direction that the pilot chamber 51 shrinks due to the biasing force of the spring 58, and enables the flow of working oil in the neutral passage 83.

Moreover, the neutral cut valve 50 includes a drain port 59 that allows the drain chamber 54 to communicate with the tank 102. The working oil inside the drain chamber 54 is discharged from the drain port 59 to the tank 102 as drain fluid.

In the present embodiment, the drain port 59 is formed in the cap 56. Since the drain port 59 is formed in the cap 56 and the cap 56 is formed separately to the valve body 52, there is no need to add any changes to the valve body 52 when changing the size and dimension of the drain port 59. Therefore, it is possible to improve the versatility of the neutral cut valve 50.

The drain port 59 is formed in the drain chamber wall 55 so as to face the spool 53. In the present embodiment, the drain port 59 is formed along the same axis as the spool 53. The movement of the spool 53 is restricted by becoming in contact with the drain chamber wall 55, more specifically with the peripheries of the drain port 59.

The spool 53 has a communicating passage 60 that allows the drain port 59 to communicate with the drain chamber 54 when the movement of the spool 53 is restricted by the drain chamber wall 55. Therefore, the flow of the drain fluid from the drain chamber 54 to the drain port 59 is not blocked even when the movement of the spool 53 is restricted by the drain chamber wall 55. Therefore, the working oil inside the drain chamber 54 can be discharged from the drain port 59 to the tank 102 as drain fluid, regardless of the position of the spool 53.

The valve body 52 is formed with a drain passage 61 that communicates with the sliding hole 57 and guides the drain fluid from the load retaining portion 40 to the drain chamber 54. By the switching valve 46 switching to the second position 46b when the control valve 16 switches to the contracting position 16c, the working oil inside the rear pressure chamber 43 is discharged to the tank 102 via the drain passage 61, the drain chamber 54, and the drain port 59 as drain fluid.

When the control valve 16 is switched to the contracted position 16c, the neutral cut valve 50 is switched to the disconnecting position 50b, and the movement of the spool 53 is restricted by the drain chamber wall 55. Since the spool 53 has the communicating passage 60, even if the movement of the spool 53 is restricted by the drain chamber 55, the flow of the drain fluid from the drain chamber 54 to the drain port 59 will not be blocked. Therefore, regardless of the position of the spool 53, the working oil inside the rear pressure chamber 43 can be discharged from the drain port 59 as drain fluid.

The drain passage 61 is not limited to the form formed in the valve body 52. For example, the drain passage 61 may be a conduit that directly connects the rear pressure chamber 43 of the load retaining portion 40 with the drain chamber 54.

In the present embodiment in which the working oil inside the rear pressure chamber 43 of the load retaining portion 40 is discharged from the drain port 59 as drain fluid, the following effects are achieved.

The pressure of the neutral passage 83 may become greater than the pressure inside the tank 102, depending on the working situation of the pump 101. Considering as a comparative example a fluid pressure control device whose rear pressure chamber 43 of the load retaining portion 40 is connected to the neutral passage 83, when the switching valve 46 is switched to the second position 46b, the pressure inside the rear pressure chamber 43 may not decrease sufficiently, and the operated check valve 41 may not open. In a case in which the operated check valve 41 does not open, no working oil inside the counter rod side chamber 12 will flow to the control valve 16, and the boom 5 (see FIG. 1) cannot be lowered.

In the present embodiment, since the working oil of the rear pressure chamber 43 is discharged as drain fluid via a different passage from the neutral passage 83, the pressure inside the rear pressure chamber 43 decreases sufficiently when the switching valve 46 is switched to the second position 46b. Therefore, it is possible to securely open the operated check valve 41 and make the working oil inside the counter rod side chamber 12 flow to the control valve 16 to lower the boom 5 (see FIG. 1).

Moreover, since the drain passage 61 is connected to the rear pressure chamber 43, there is no need to provide a drain port for discharging the drain fluid of the load retaining portion 40 separately to the drain port 59 of the neutral cut valve 50. Therefore, it is possible to reduce the number of drain ports in the fluid pressure control device 100.

In the example shown in FIG. 3 and FIG. 4, the communicating passage 60 includes a first hole 60a extending from an end plane of the spool 53 along an axial direction of the spool 53, and a second hole 60b extending from a side plane of the spool 53 along a radial direction thereof and communicating with the first hole 60a. Since it is easy to form a hole extending in the axial direction as like the first hole 60a and a hole extending in the radial direction as like the second hole 60b in the spool 53, the communicating passage 60 including the first hole 60a and the second hole 60b is easily formed. Therefore, it is possible to easily produce the neutral cut valve 50. The communicating passage 60 is not limited to this form.

Figure 5:
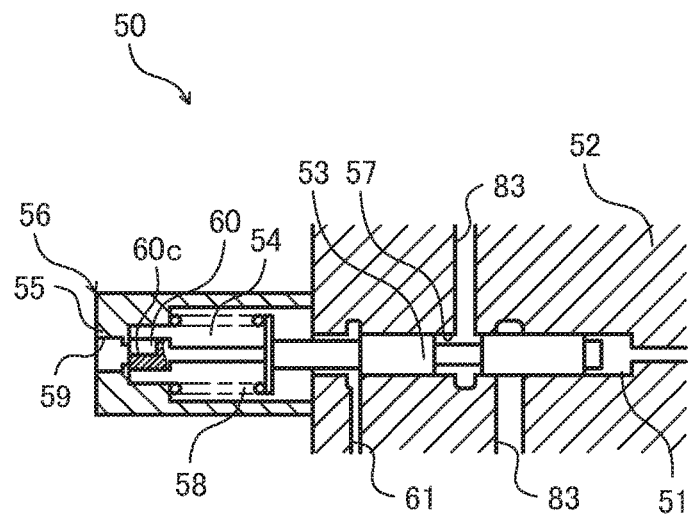
FIG. 5 is a sectional view of a neutral cut valve according to another embodiment of the present invention.

The communicating passage 60 may be a groove 60c (cutout) formed on a side plane of the spool 53 and which opens to the end plane of the spool 53, as shown in FIG. 5. Since it is easy to form the groove 60c on the side plane on the spool 53, which groove opens to the end plane of the spool 53, the communicating passage 60 including such a groove 60c is formed easily. Therefore, it is possible to easily produce the neutral cut valve 50.

Figure 6:
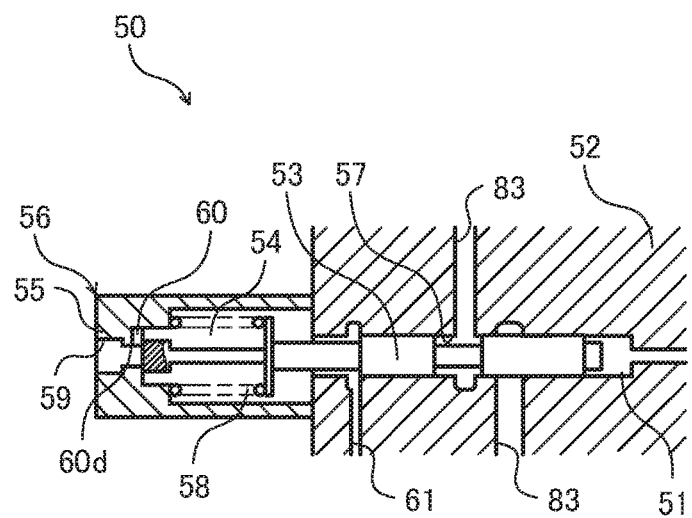
FIG. 6 is a sectional view of a neutral cut valve according to a further embodiment of the present invention.

Moreover, as shown in FIG. 6, the communicating passage 60 may be a groove 60d (cutout) formed on the periphery of the drain port 59 and which opens to an inner side plane of the drain port 59. That is to say, the communicating passage 60 may be formed on the drain chamber wall 55. In a case in which the groove 60d is formed on a side facing the drain chamber 54 in the drain chamber wall 55 of the cap 56, there is no need to prepare a spool 53 that has the communicating passage 60 (see FIG. 3 to FIG. 5), when replacing the spool 53. Therefore, it is possible to improve the versatility of the neutral cut valve 50.

Moreover, a valve device to which the present embodiment is applicable is not limited to the neutral cut valve 50. The present embodiment is applicable to valve devices having a drain port.

Furthermore, the drain passage 61 may be connected to a valve device different from the load retaining portion 40. That is to say, the drain passage 61 may be formed to guide the drain fluid from other valve devices different from the neutral cut valve 50, to the drain chamber 54. The drain passage 61 may be a form that guides the drain fluid from a plurality of other valve devices, to the drain chamber 54.

Figure 7:
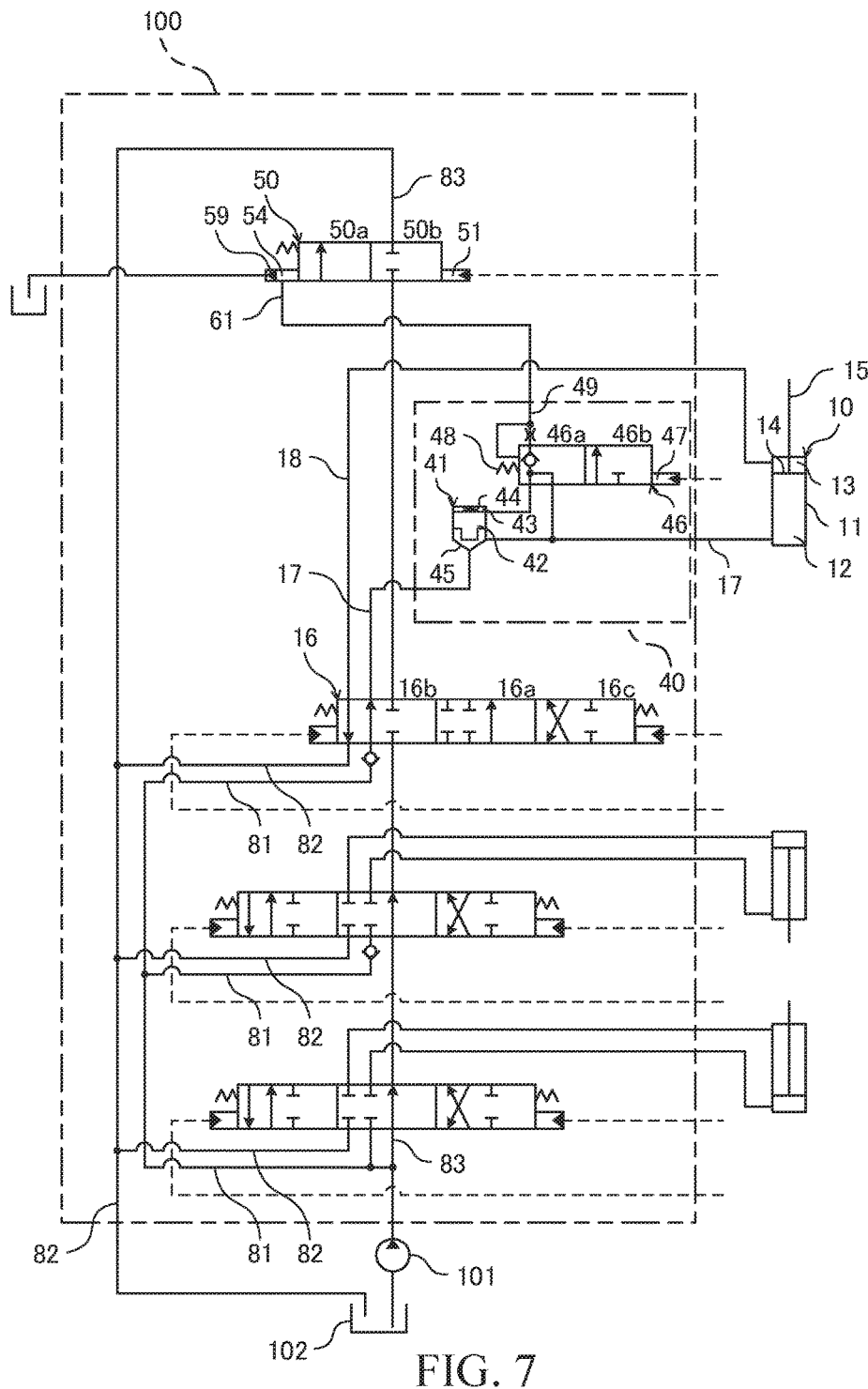
FIG. 7 is a hydraulic circuit diagram of a fluid pressure control device according to an embodiment of the present invention, and shows a state in which a control valve is in an extending position.
Figure 8:
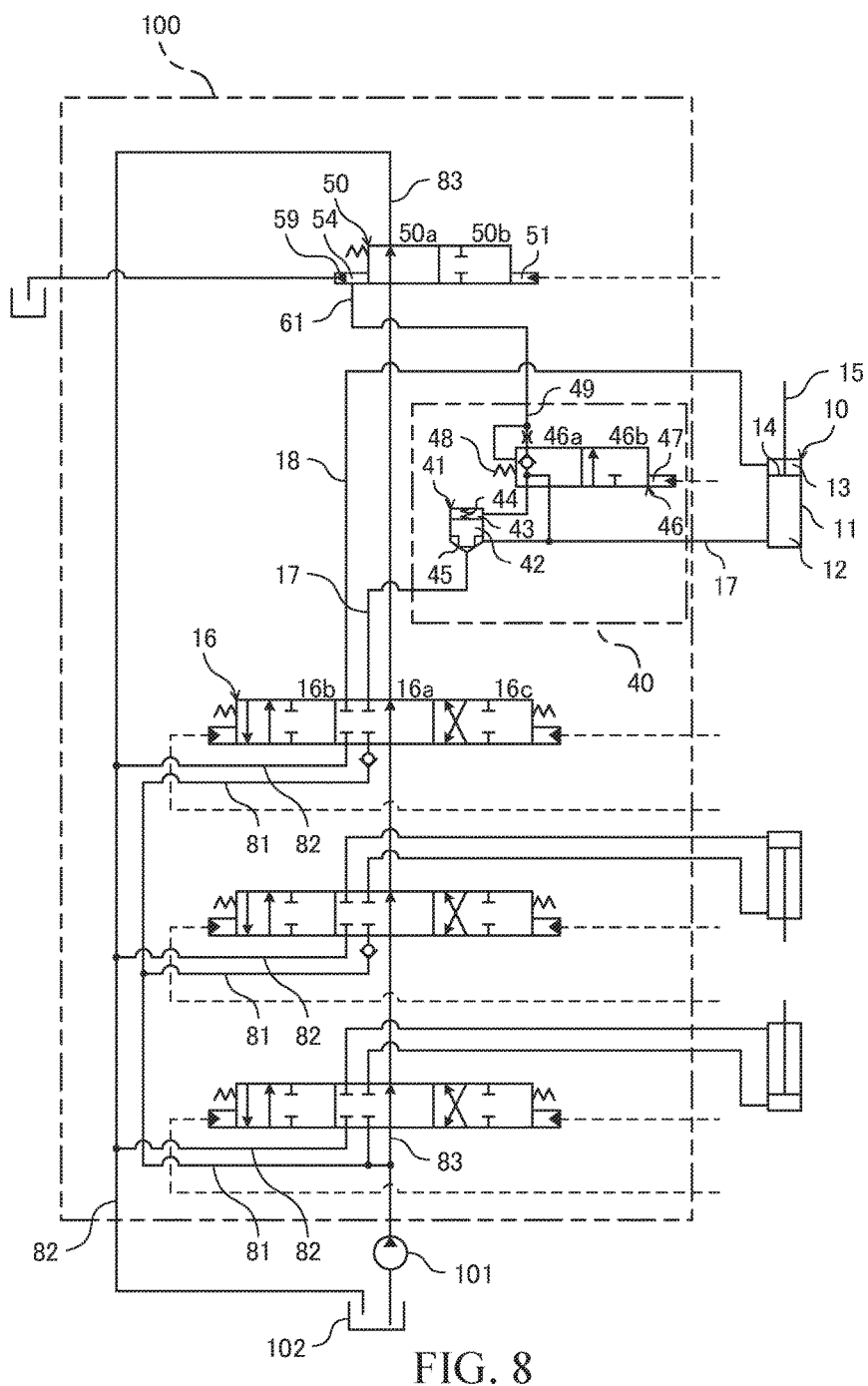
FIG. 8 is a hydraulic circuit diagram of a fluid pressure control device according to an embodiment of the present invention, and shows a state in which the control valve is in a neutral position.
Figure 9:
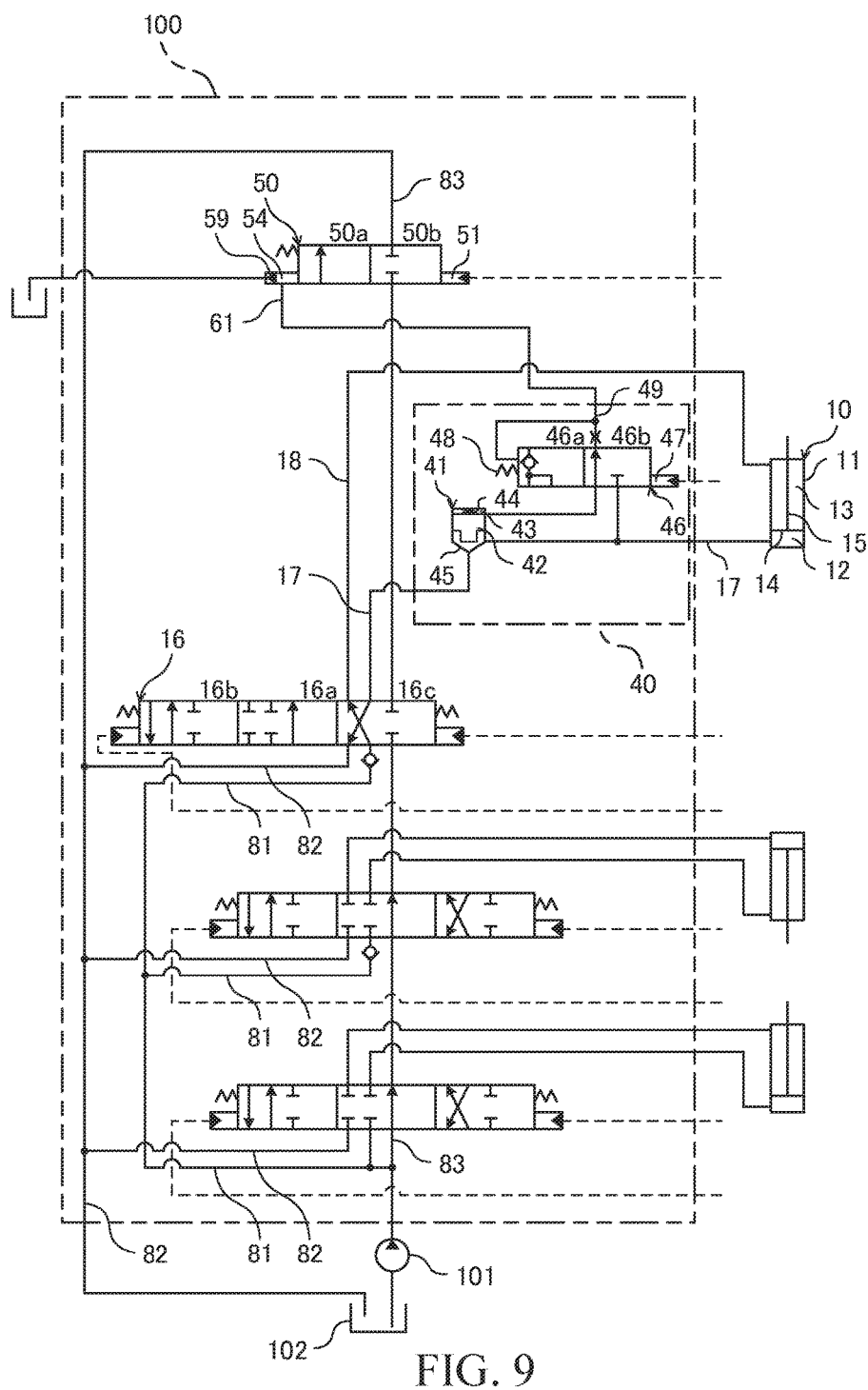
FIG. 9 is a hydraulic circuit diagram of a fluid pressure control device according to an embodiment of the present invention, and shows a state in which the control valve is in a contracting position.

Next describes operations of the fluid pressure control device 100 and the neutral cut valve 50, with reference to FIG. 7 to FIG. 9.

First described is a case in which the control valve 16 is switched from the neutral position 16a to the extending position 16b, with reference to FIG. 7.

Together with the control valve 16 switching from the neutral position 16a to the extending position 16b, pilot pressure is supplied to the pilot chamber 51, and the neutral cut valve 50 is switched to the disconnecting position 50b. At this time, since no pilot pressure is supplied to the pilot chamber 47, the switching valve 46 maintains the first position 46a.

The control valve 16 allows the supplying passage 81 to communicate with the first main passage 17, and allows the discharging passage 82 to communicate with the second main passage 18. Therefore, the working oil discharged from the pump 101 is sent to the operated check valve 41 via the first main passage 17.

Since the switching valve 46 is in the first position 46a, the flow of the working oil from the rear pressure chamber 43 to the check valve passage 49 is blocked and the flow from the counter rod side chamber 12 to the rear pressure chamber 43 is enabled. Therefore, the valving element 42 receives a load due to the biasing force of the spring 44 and the pressure of the counter rod side chamber 12, in the valve-closing direction.

Since the working oil discharged from the pump 101 is sent to the operated check valve 41, the working oil discharged from the pump 101 acts on the valving element 42. Therefore, the valving element 42 receives a load due to the pressure of the working oil discharged from the pump 101 in addition to the load due to the pressure of the counter rod side chamber 12, in the valve-opening direction.

The load due to the pressure of the counter rod side chamber 12 and the pressure of the working oil discharged from the pump 101 is greater than the load due to the biasing force of the spring 44 and the pressure of the counter rod side chamber 12. Therefore, the valving element 42 separates away from the seat portion 45 and opens the operated check valve 41, thus enabling the flow of the working oil in the first main passage 17. The working oil discharged from the pump 101 is sent to the counter rod side chamber 12 and the working oil inside the rod side chamber 13 is sent to the discharging passage 82, which extends the boom cylinder 10. As a result, the digging portion 4 (see FIG. 1) lifts up.

Since the neutral cut valve 50 is in the disconnecting position 50*b*, the working oil discharged from the pump 101 is more securely prevented from flowing in the neutral passage 83. Therefore, the pressure of the working oil discharged from the pump 101 propagates more efficiently to the counter rod side chamber 12, and allows for acting on a larger force to the boom cylinder 10.

Next described is a case in which the control valve 16 is switched from the extending position 16*b* to the neutral position 16*a*, with reference to FIG. 8. Assume here that the control valves 26 and 36 are in their neutral positions 26*a* and 36*a*.

Together with the control valve 16 switching from the extending position 16*b* to the neutral position 16*a*, the supply of the pilot pressure to the pilot chamber 51 is blocked and the neutral cut valve 50 is switched to the communicating position 50*a*. At this time, since no pilot pressure is supplied to the pilot chamber 47, the switching valve 46 maintains the first position 46*a*.

The control valve 16 enables the flow of working oil in the neutral passage 83, and blocks the flow of working oil in the supplying passage 81. Therefore, the working oil discharged from the pump 101 is not sent to the operated check valve 41. Since the control valves 26 and 36 are in their neutral positions 26*a* and 36*a* and the neutral cut valve 50 is in the communicating position 50*a*, the working oil discharged from the pump 101 returns to the tank 102 via the neutral passage 83.

Since the switching valve 46 is in the first position 46*a*, the discharging of the working oil from the rear pressure chamber 43 to the check valve passage 49 is blocked, and the flow of working oil from the counter rod side chamber 12 to the rear pressure chamber 43 is enabled. Therefore, the valving element 42 receives a load due to the biasing force of the spring 44 and the pressure of the counter rod side chamber 12, in the valve-closing direction.

Since the working oil discharged from the pump 101 is not sent to the operated check valve 41, the pressure of the working oil discharged from the pump 101 does not act on the valving element 42. Therefore, the valving element 42 receives the load by just the load due to the pressure of the counter rod side chamber 12 in the valve-opening direction.

The load due to the pressure on the counter rod side chamber 12 is smaller than the load due to the biasing force of the spring 44 and the pressure of the counter rod side chamber 12. Therefore, the valving element 42 sits on the seat portion 45 and the operator check valve 41 closes, thus blocking the flow of working oil in the first main passage 17. This retains the load pressure acting on the counter rod side chamber 12, and prevents the digging portion 4 (see FIG. 1) from lowering.

Next described is a case in which the control valve 16 switches from the neutral position 16*a* to the contracting position 16*c*, with reference to FIG. 9.

Together with the control valve 16 switching from the neutral position 16*a* to the contracting position 16*c*, pilot pressure is supplied to the pilot chamber 47, and pilot pressure is supplied to the pilot chamber 51. Therefore, the switching valve 46 is switched to the second position 46*b*, and the neutral cut valve 50 is switched to the disconnecting position 50*b*.

The control valve 16 allows the supplying passage 81 to communicate with the second main passage 18, and allows the discharging passage 82 to communicate with the first main passage 17. Therefore, the working oil discharged from the pump 101 is sent to the rod side chamber 13 via the second main passage 18.

Since the switching valve 46 is in the second position 46*b*, the discharging of the working oil from the rear pressure chamber 43 to the check valve passage 49 is enabled, and the supply of the working oil from the counter rod side chamber 12 to the rear pressure chamber 43 is blocked. Since the working oil inside the rear pressure chamber 43 is discharged to the check valve passage 49 without any working oil being supplied to the rear pressure chamber 43, hardly any pressure of the working oil acts on the rear pressure chamber 43. Therefore, the valving element 42 receives load just due to the biasing force of the spring 44, in the valve-closing direction.

Since the working oil discharged from the pump 101 is sent to the rod side chamber 13, the pressure of the working oil discharged from the pump 101 acts on the rod side chamber 13. The pressure inside the rod side chamber 13 acts on the valving element 42 in the valve-opening direction via the counter rod side chamber 12 and the first main passage 17. Therefore, the valving element 42 receives the load due to the load pressure, in the valve-opening direction.

The load pressure is greater than the load due to the biasing force of the spring 44. Therefore, the valving element 42 separates away from the seat portion 45, and the operated check valve 41 opens and enables the working oil to flow in the first main passage 17. The working oil discharged from the pump 101 is sent to the rod side chamber 13, and the working oil inside the counter rod side chamber 12 is sent to the discharging passage 82, which contracts the boom cylinder 10. As a result, the digging portion 4 (see FIG. 1) lowers.

Since the neutral cut valve 50 is in the disconnecting position 50*b*, the working oil discharged from the pump 101 is more securely prevented from flowing in the neutral passage 83. Therefore, the pressure of the working oil discharged from the pump 101 propagates more efficiently to the rod side chamber 13, and allows for applying a larger force on the boom cylinder 10.

When the neutral cut valve 50 is in the disconnecting position 50*b*, the movement of the spool 53 is restricted by the drain chamber wall 55, as shown in FIG. 4.

If the spool 53 blocks the drain port 59 when the movement of the spool 53 is restricted by the drain chamber wall 55, the discharging of the working oil from the rear pressure chamber 43 to the drain port 59 is blocked. Therefore, the working oil inside the rear pressure chamber 43 will not be discharged from the drain port 59, and the operated check valve 41 will maintain its closed state. As a result, regardless that the control valve 16 is in the contracting position 16*c* and the switching valve 46 is in the second position 46*b*, the digging portion 4 (see FIG. 1) cannot be lowered.

In the present embodiment, since the communicating passage 60 allows the drain chamber 54 to communicate with the drain port 59, the flow of the drain fluid from the rear pressure chamber 43 to the drain port 59 is not blocked even when the movement of the spool 53 is restricted by the drain chamber wall 55. Therefore, when the switching valve 46 is in the second position 46*b*, the working oil inside the rear pressure chamber 43 can be discharged from the drain port 59 as drain fluid. As a result, the operated check valve 41 can be opened, and the digging portion 4 (see FIG. 1) can be lowered.

According to the above present embodiment, the following effects are achieved.

Since the spool 53 has the communicating passage 60, the flow of the drain fluid from the drain chamber 54 to the drain port 59 is not blocked even when the movement of the spool 53 is restricted by the drain chamber wall 55. Therefore, regardless of the position of the spool 53, the drain fluid of the load retaining portion 40 can be discharged from the drain port 59.

Since the drain port 59 is formed in the cap 56 and the cap 56 is formed separately to the valve body 52, there is no need to add any changes to the valve body 52 when changing the size and dimension of the drain port 59. Therefore, it is possible to improve the versatility of the neutral cut valve 50.

Since the working oil of the rear pressure chamber 43 is discharged as drain fluid via a passage different from the neutral passage 83, the pressure inside the rear pressure chamber 43 decreases sufficiently when the switching valve 46 switches to the second position 46b. Therefore, it is possible to securely open the operated check valve 41 and make the working oil inside the counter rod side chamber 12 flow to the control valve 16 to lower the boom 5 (see FIG. 1).

Moreover, since the drain passage 61 is connected to the rear pressure chamber 43, there is no need to provide a drain port for discharging the drain fluid of the load retaining portion 40 separately to the drain port 59 of the neutral cut valve 50. Therefore, it is possible to reduce the number of drain ports in the fluid pressure control device 100.

Since the switching valve 46 blocks the supplying of the working oil from the counter rod side chamber 12 to the rear pressure chamber 43 when the discharging of the working oil from the rear pressure chamber 43 to the drain chamber 54 is enabled, the working oil inside the counter rod side chamber 12 does not flow to the drain chamber 54. Therefore, it is possible to prevent the discharging of a large amount of working oil from the drain port 59.

Moreover, since the switching valve 46 enables the supply of working oil from the counter rod side chamber 12 to the rear pressure chamber 43 when blocking the discharging of the working oil from the rear pressure chamber 43 to the drain chamber 54, the working oil of the counter rod side chamber 12 accumulates in the rear pressure chamber 43, and pressure inside the counter rod side chamber 12 acts on the rear pressure chamber 43. Therefore, it is possible to securely block the flow of the working oil from the counter rod side chamber 12 to the control valve 16 due to the operated check valve 41.

The following describes the configuration, functions, and effects of the embodiment of the present invention collectively.

In the present embodiment, the neutral cut valve 50 includes a spool 53 housed movably inside a valve body 52, a drain chamber wall 55 configured to define a drain chamber 54 into which the spool 53 enters and exits together with a movement of the spool 53, a drain port 59 formed in the drain chamber wall 55 facing the spool 53, the drain port 59 being configured to allow the drain chamber 54 to communicate with a tank 102, and a drain passage 61 configured to guide drain fluid from a load retaining portion 40 to the drain chamber 54, the neutral cut valve 50 being characterized in that at least one of the drain chamber wall 55 and the spool 53 includes a communicating passage 60 configured to allow the drain port 59 to communicate with the drain chamber 54 when the movement of the spool 53 is restricted by the drain chamber wall 55.

In this configuration, at least one of the drain chamber wall 55 and the spool 53 has the communicating passage 60; hence, the flow of the drain fluid from the drain chamber 54 to the drain port 59 is not blocked even when the movement of the spool 53 is restricted by the drain chamber wall 55. Therefore, regardless of the position of the spool 53, the drain fluid of the load retaining portion 40 can be discharged from the drain chamber 54.

Moreover, in the present embodiment, the communicating passage 60 includes a first hole 60a provided in the spool 53 and extending in an axial direction of the spool 53, and a second hole 60b provided in the spool 53 and extending in a radial direction of the spool 53, the communicating passage 60 being characterized in that the first hole 60a communicates with the second hole 60b.

In this configuration, the first hole 60a extends in the axial direction of the spool 53, and the second hole 60b extends in the radial direction of the spool 53. Since it is easy to form a hole extending in the axial direction as like the first hole 60a and a hole extending in the radial direction as like the second hole 60b in the spool 53, the communicating passage 60 including the first hole 60a and the second hole 60b is easily formed. Therefore, it is possible to easily produce the neutral cut valve 50.

Moreover, in the present embodiment, the communicating passage 60 is characterized by including a groove 60c provided on a side plane of the spool 53 and opening to an end plane of the spool 53.

In this configuration, the groove 60c is provided on the side plane of the spool 53 and opens to the end plane of the spool 53. Since it is easy to form such a groove 60c to the spool 53, the communicating passage 60 including the groove 60c can be formed easily. Therefore, it is possible to easily produce the neutral cut valve 50.

Moreover, in the present embodiment, the neutral cut valve 50 further includes a cap 56 formed separately to the valve body 52 and provided with the drain chamber wall 55, the neutral cut valve 50 being characterized in that a drain port 59 is formed in the cap 56.

In this configuration, the drain port 59 is formed in the cap 56 and the cap 56 is formed separately to the valve body 52. Hence, there is no need to add any changes to the valve body 52 when changing the size and dimension of the drain port 59. Therefore, it is possible to improve the versatility of the neutral cut valve 50.

Moreover, in the present embodiment, the communicating passage 60 is characterized by including a groove 60d provided on a side facing the drain chamber 54 of the drain chamber wall 55 of the cap 56.

In this configuration, the groove 60d is provided on a side facing the drain chamber 54 in the drain chamber wall 55 of the cap 56. Hence, there is no need to prepare a spool 53 that has the communicating passage 60, when replacing the spool 53. Therefore, it is possible to improve the versatility of the neutral cut valve 50.

Moreover, in the present embodiment, a fluid pressure control device 100, which controls extension and contraction of a cylinder 10 configured to drive the boom 5, includes a control valve 16 configured to control supplying of working oil from a pump 101 to the boom cylinder 10, a first main passage 17 connecting a counter rod side chamber 12 of the boom cylinder 10 to which load pressure acts with the control valve 16 when the control valve 16 is in an neutral position 16a to block a flow of working oil to the boom cylinder 10, a load retaining portion 40 provided in the first main passage 17, an neutral passage 83 configured to return the working oil discharged from the pump 101 to a tank 102 when the control valve 16 is in the neutral position 16a, and an neutral cut valve 50 provided in the neutral passage 83, the neutral cut valve being configured to switch between enabling and blocking a flow of working oil in the neutral passage 83, a fluid pressure control device 100 being characterized in that the load retaining portion 40 includes an operated check valve 41 configured to enable the working oil from control valve 16 to the counter rod side chamber 12 while enabling the flow of the working oil from the counter rod side chamber 12 to the control valve 16 when the working oil inside the rear pressure chamber 43 is discharged as drain fluid, and the drain passage 61 is connected to the rear pressure chamber 43.

In this configuration, the drain passage 61 is connected to the rear pressure chamber 43. Hence, the drain fluid of the load retaining portion 40 is guided to the drain chamber 54 via the drain passage 61, and is discharged from the drain port 59 of the neutral cut valve 50. Therefore, it is possible to reduce the number of drain ports in the fluid pressure control device 100.

Moreover, since the working oil inside the rear pressure chamber 43 is discharged, the pressure in the rear pressure chamber 43 decreases sufficiently. Therefore, it is possible to open the operated check valve 41 more securely when making the working oil inside the counter rod side chamber 12 flow to the control valve 16.

Moreover, in the present embodiment, the fluid pressure control device 100 is characterized in that the load retaining portion 40 further includes a switching valve 46 configured to control the supplying of the working oil from the counter rod side chamber 12 to the rear pressure chamber 43 and control the discharging of the working oil from the rear pressure chamber 43 to the drain chamber 54, the switching valve 46 having a first position 46a to enable supplying of the working oil from the counter rod side chamber 12 to the rear pressure chamber 43 when the discharging of the working oil from the rear pressure chamber 43 to the drain chamber 54 is blocked, and a second position 46b to block the supplying of the working oil from the counter rod side chamber 12 to the rear pressure chamber 43 when the discharging of the working oil from the rear pressure chamber 43 to the drain chamber 54 is enabled.

In this configuration, the switching valve 46 enables the supplying of the working oil from the counter rod side chamber 12 to the rear pressure chamber 43 when blocking the discharging of the working oil from the rear pressure chamber 43 to the drain chamber 54. Hence, the working oil of the counter rod side chamber 12 accumulates in the rear pressure chamber 43, and the pressure inside the counter rod side chamber 12 acts on the rear pressure chamber 43. Therefore, it is possible to securely block the flow of the working oil from the counter rod side chamber 12 to the control valve 16 due to the operated check valve 41.

Moreover, the switching valve 46 blocks the supplying of the working oil from the counter rod side chamber 12 to the rear pressure chamber 43 when enabling the discharge of the working oil from the rear pressure chamber 43 to the drain chamber 54. Hence, the working oil inside the counter rod side chamber 12 does not flow to the drain chamber 54. Therefore, it is possible to prevent the discharging of a large amount of working oil from the drain port 59.

Embodiments of this invention were described above, but the above embodiments are merely examples of applications of this invention, and the technical scope of this invention is not limited to the specific constitutions of the above embodiments.

This application claims priority based on Japanese Patent Application No. 2015-83463 filed with the Japan Patent Office on Apr. 15, 2015, the entire contents of which are incorporated into this specification.

The invention claimed is:

1. A fluid pressure control device for controlling extension and contraction of a cylinder configured to drive a load, the fluid pressure control device, comprising:
a control valve configured to control supplying of a working fluid from a fluid pressure supply portion to the cylinder;
a main passage configured to connect the control valve with a load side pressure chamber of the cylinder on which a load pressure acts due to the load when the control valve is in an neutral position at which a flow of the working fluid into the cylinder is blocked;
a neutral passage configured to return the working fluid discharged from the fluid pressure supply portion to a fluid storage portion when the control valve is in the neutral position;
a neutral cut valve provided in the neutral passage, and being configured to switch between enabling and blocking a flow of the working fluid in the neutral passage, the neutral cut valve including
a spool movably housed inside a valve body;
a drain chamber wall configured to define a drain chamber connected to the valve body, the spool being configured to enter in and exit from the drain chamber;
a drain port formed in the drain chamber wall facing the spool, the drain port being configured to allow the drain chamber to communicate with the fluid storage portion;
a drain passage configured to guide a drain fluid to the drain chamber; and
a communicating passage included in at least one of the drain chamber wall and the spool, and being configured to allow the drain port to communicate with the drain chamber when the movement of the spool is restricted by the drain chamber wall; and
a load retaining portion provided in the main passage, and including an operated check valve having a rear pressure chamber, and being configured to
enable a flow of the working fluid from the control valve to the load side pressure chamber, and
enable a flow of the working fluid from the load side pressure chamber to the control valve when the working fluid in the rear pressure chamber is discharged via the drain passage as the drain fluid.

2. The fluid pressure control device according to claim 1, wherein:
the communicating passage is included in the spool, and includes a first hole extending in an axial direction of the spool, and a second hole extending in a radial direction of the spool, and
the first hole communicates with the second hole.

3. The fluid pressure control device according to claim 1, wherein
the communicating passage is included in the spool, and includes a cutout provided on a side surface of the spool, the cutout opening to an end of the spool.

4. The fluid pressure control device according to claim 1, further comprising a cap formed separately to the valve body and provided with the drain chamber wall,
wherein the drain port is formed in the cap.

5. The fluid pressure control device according to claim 4, wherein the communicating passage is included in the drain chamber wall, and includes a cutout provided on a side of the communicating passage, facing the drain chamber of the drain chamber wall of the cap.

6. The fluid pressure control device according to claim 1, wherein the load retaining portion further includes a switching valve configured to control supplying of the working fluid from the load side pressure chamber to the rear pressure chamber and control discharging of the working fluid from the rear pressure chamber to the drain chamber, and the switching valve has a first position at which the working fluid from the load side pressure chamber to the rear pressure chamber is allowed to be supplied when discharging of the working fluid from the rear pressure chamber to the drain chamber is blocked, and a second position at which the working fluid from the load side pressure chamber to the rear pressure chamber is blocked when discharging of the working fluid from the rear pressure chamber to the drain chamber is allowed to be flowed.

\* \* \* \* \*